(12) United States Patent
Huang et al.

(10) Patent No.: US 10,522,117 B2
(45) Date of Patent: Dec. 31, 2019

(54) AUTOMOTIVE THEATER APPARATUS AND RELATED OPERATING METHOD

(71) Applicants: Mindtronic AI Co., Ltd., Grand Cayman (KY); Shanghai XPT Technology Limited, Shanghai (CN)

(72) Inventors: Mu-Jen Huang, Taipei (TW); Bou-Chen Kuo, Taipei (TW); Ya-Li Tai, Taoyuan (TW); Yu-Sian Jiang, Kaohsiung (TW)

(73) Assignees: Mindtronic AI Co., Ltd., Grand Cayman (KY); Shanghai XPT Technology Limited, Shanghai (CN)

( * ) Notice: Subject to any disclaimer, the term of this patent is extended or adjusted under 35 U.S.C. 154(b) by 17 days.

(21) Appl. No.: 16/006,831

(22) Filed: Jun. 12, 2018

(65) Prior Publication Data

US 2019/0213977 A1   Jul. 11, 2019

(30) Foreign Application Priority Data

Jan. 5, 2018   (CN) .......................... 2018 1 0012544
Jan. 5, 2018   (CN) ...................... 2018 2 0019368 U

(51) Int. Cl.
| | |
|---|---|
| *G09G 5/38* | (2006.01) |
| *G06T 7/73* | (2017.01) |
| *G06K 9/46* | (2006.01) |
| *G02B 27/01* | (2006.01) |

(52) U.S. Cl.
CPC ............ *G09G 5/38* (2013.01); *G02B 27/0101* (2013.01); *G06K 9/46* (2013.01); *G06T 7/74* (2017.01); *G02B 2027/011* (2013.01); *G02B 2027/014* (2013.01); *G02B 2027/0138* (2013.01); *G02B 2027/0141* (2013.01)

(58) Field of Classification Search
CPC ........ G09G 5/38; G02B 27/0101; G06K 9/46; G06T 7/73; G06T 7/74; G06T 19/006; B60R 1/00; B60R 1/001; B60R 11/0229
See application file for complete search history.

(56) References Cited

U.S. PATENT DOCUMENTS

| | | | |
|---|---|---|---|
| 10,242,457 B1 * | 3/2019 | Sibley | ........................ G06T 7/73 |
| 10,343,555 B2 * | 7/2019 | Tan | ....................... B60N 2/0248 |
| 2015/0094897 A1 * | 4/2015 | Cuddihy | ............. B60R 11/0229 |
| | | | 701/23 |
| 2019/0121522 A1 * | 4/2019 | Davis | ................... G06F 3/04815 |

\* cited by examiner

*Primary Examiner* — Sardis F Azongha
(74) *Attorney, Agent, or Firm* — Winston Hsu

(57) ABSTRACT

An automotive theater apparatus and a related operating method are disclosed. In one aspect, an example embodiment is disclosed that includes an image generating device configured to generate an image and a surface structure whereon the image is formed. The example embodiment further includes a substantially transparent optical element configurable to be positioned in a line-of-sight of a user, wherein the substantially transparent optical element is configured to enable the user to view a virtual image of the generated image.

18 Claims, 7 Drawing Sheets

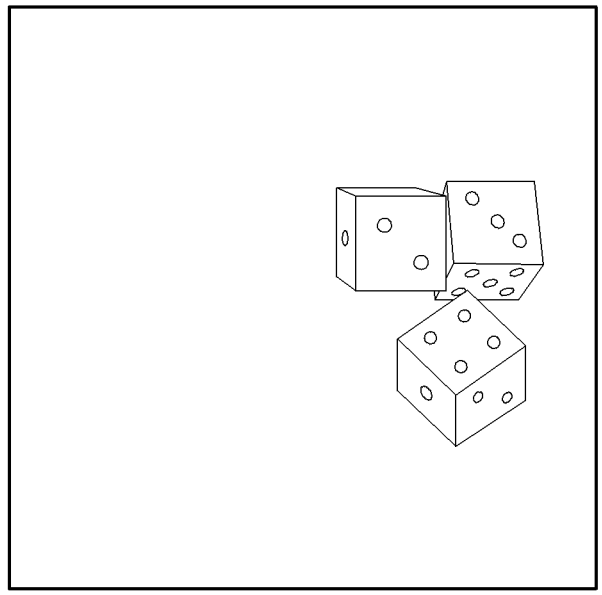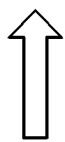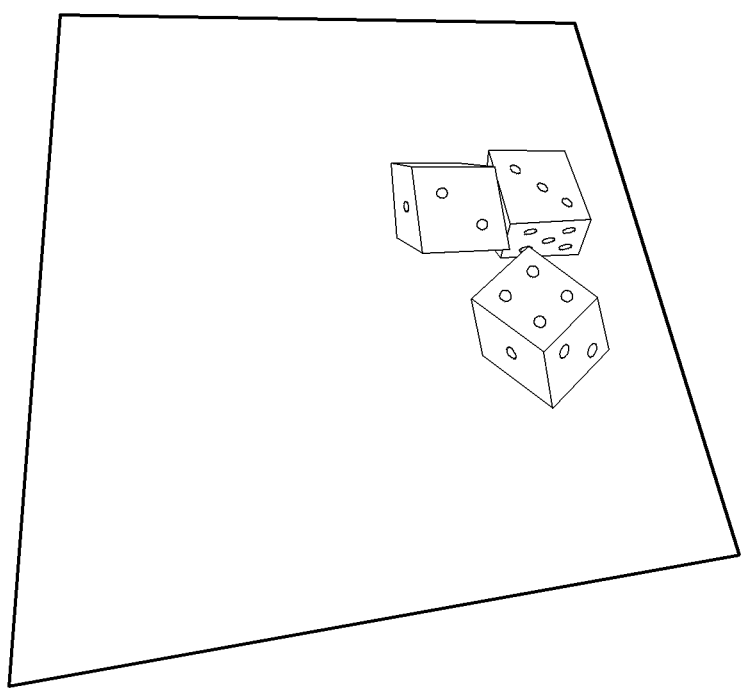
FIG. 3

AUTOMOTIVE THEATER APPARATUS AND RELATED OPERATING METHOD

BACKGROUND OF THE INVENTION

1. Field of the Invention

The present invention relates to an automotive theater apparatus and a related operating method, and more particularly, to an automotive theater apparatus capable of showing a large Field-of-View image combined with natural scene and a related operating method.

2. Description of the Prior Art

In-car entertainment systems in use today generally comprises of a display configured on the dashboard or behind the front seat headrests. Due to dimensional constraints, a large display cannot be used in conventional vehicles. Furthermore, the distance between the viewer and the display is not optimized, often causing tiredness after viewing. An in-car entertainment system that can provide a large field of view and optimal viewing distance is desired.

SUMMARY OF THE INVENTION

The present invention provides an automotive theater apparatus capable of displaying a large Field-of-View image at optimal viewing distance and a related operating method.

According to the claimed invention, an automotive theater apparatus is applied to a vehicle and includes an image generating device, a surface structure and a substantially transparent optical element. The image generating device is configured to generate an image. The image is formed on the surface structure. The substantially transparent optical element is configurable to be positioned in a line-of-sight of a user and configured to enable the user to view a virtual image of the generated image. The automotive theater apparatus further includes a supporting device configured to position the substantially transparent optical element in the line-of-sight of the user, and a driving device connected to the supporting device. The driving device is configured to move the substantially transparent optical element from an accommodating position to an operating position located between the user and the surface structure, and further to move the substantially transparent optical element from the operating position to the accommodating position.

According to the claimed invention, an operating method is applied to an automotive theater apparatus and includes providing a surface structure of a vehicle with the automotive theater apparatus, generating, by an image generating device, an image on the surface structure, and positioning a substantially transparent optical element in a line-of-sight of a user. The substantially transparent optical element is configured to enable the user to view a virtual image of the generated image.

When the automotive theater apparatus of the present invention projects the image onto the sunroof of the vehicle for performance, an image displaying function of the automotive theater apparatus is in operation while the vehicle is parked or in an autonomous driving mode. The automotive theater apparatus may be integrated with an entertainment system, such as the audio equipment, the data transmission equipment or the detachable memory equipment. The data transmission equipment may be an interface of the universal serial bus (USB) connected to the storage module for playing the video. The detachable memory equipment may be used to attach to a memory card for playing the video stored inside the memory card. The automotive theater apparatus may be preferably applied to the sunroof of the vehicle, and a translucent property of the vehicle sunroof may simultaneously show the natural scene outside the window and the image generated by the image generating device for showing the virtual reality function.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a diagram of an image calibrated by the automotive theater apparatus according to the embodiment of the present invention.

DETAILED DESCRIPTION

Figure 1:
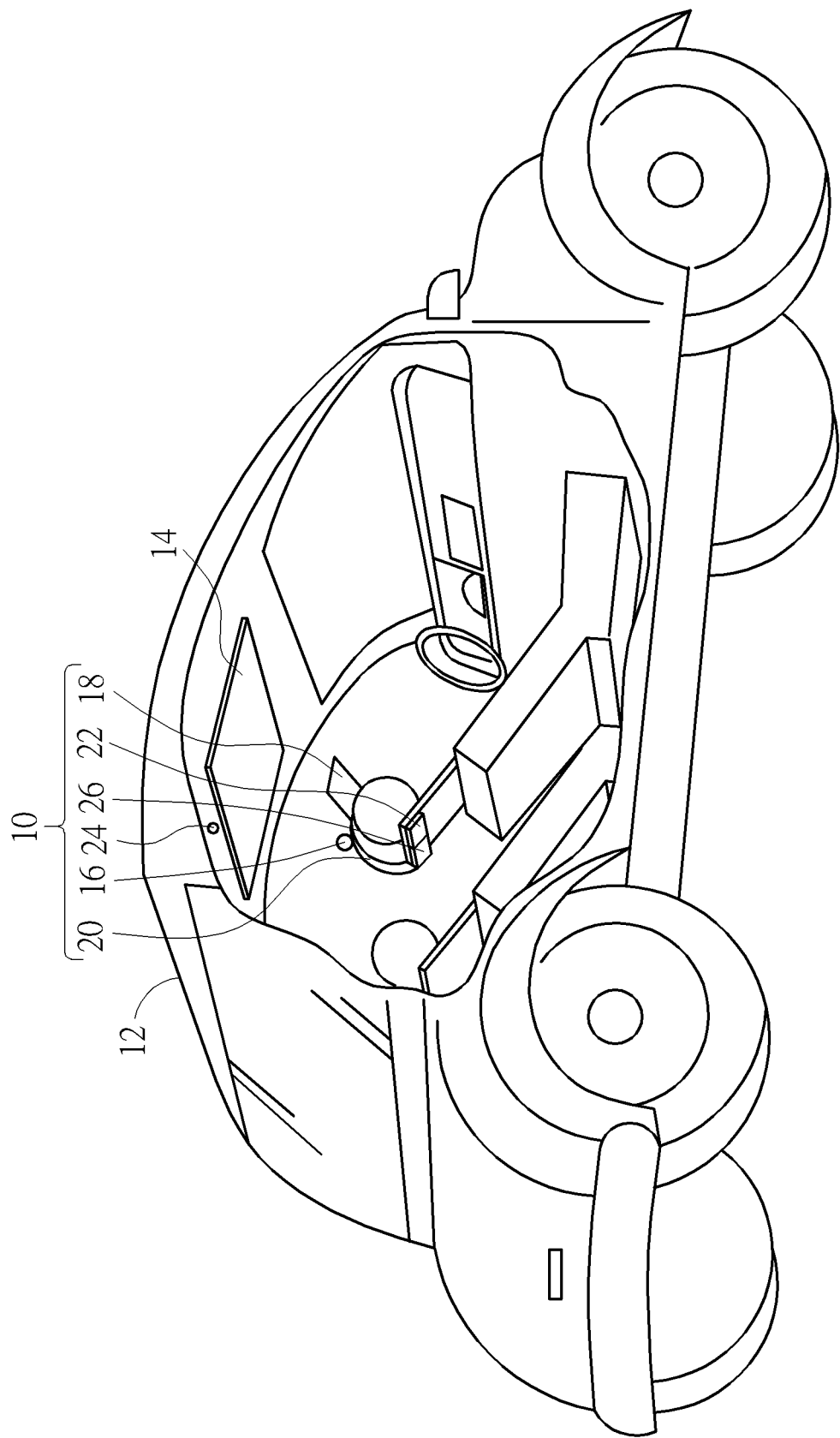
FIG. 1 and FIG. 2 respectively are diagrams of an automotive theater apparatus in different views according to an embodiment of the present invention.
Figure 2:
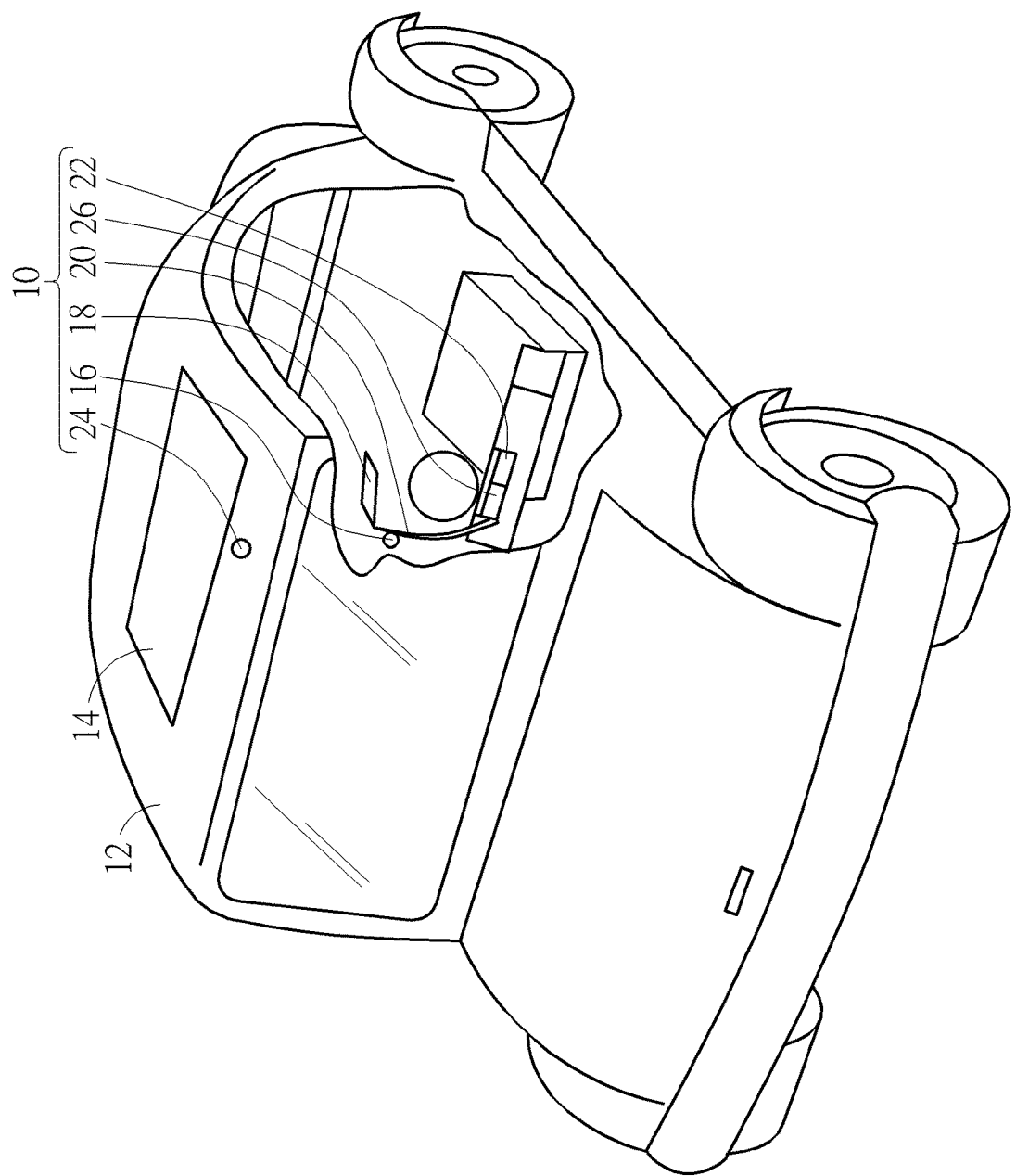

Please refer to FIG. 1 to FIG. 3. FIG. 1 and FIG. 2 respectively are diagrams of an automotive theater apparatus 10 indifferent views according to an embodiment of the present invention. FIG. 3 is a diagram of an image calibrated by the automotive theater apparatus according to the embodiment of the present invention. The automotive theater apparatus 10 is installed on the vehicle 12; the vehicle 12 has a surface structure 14, and the surface structure 14 preferably is, but not limited to, a transparent surface. The surface structure 14 is a displaying interface of the automotive theater apparatus 10; for example, the surface structure 14 maybe a sunroof, a front windshield, a rear windshield or door glass of the vehicle 12. The surface structure 14 may be made of a substantially transparent material, so that a user not only can view the image displayed on the surface structure 14, but also a natural scene outside the window. The natural scene outside the surface structure 14 may be a background of the image displayed by the automotive theater apparatus 10, and the projected image may be generated depending on the background scene for a virtual reality experience.

The automotive theater apparatus 10 may include an image generating device 16, and a substantially transparent optical element 18. In some embodiments, the image generating device 16 may be a projector used to project the image onto the surface structure 14. The surface structure 14 may be processed by surface treatment, or pasted by a scattering film, or coated by scattering material to provide light scattering function. The substantially transparent optical element 18 is configured to calibrate distortion of the projected image. As shown in FIG. 3, the distorted image in the left-side is the projected image generated by the image generating device 16, and the user can see the calibrated image in the right-side through the substantially transparent optical element 18. In another possible embodiment, the image generating device 16 may be a translucent display panel assembled with the surface structure 14, such as an organic light-emitting diode (OLED) display panel. The substantially transparent optical element 18 may be a convex lens, such as the Fresnel lens.

Figure 4:
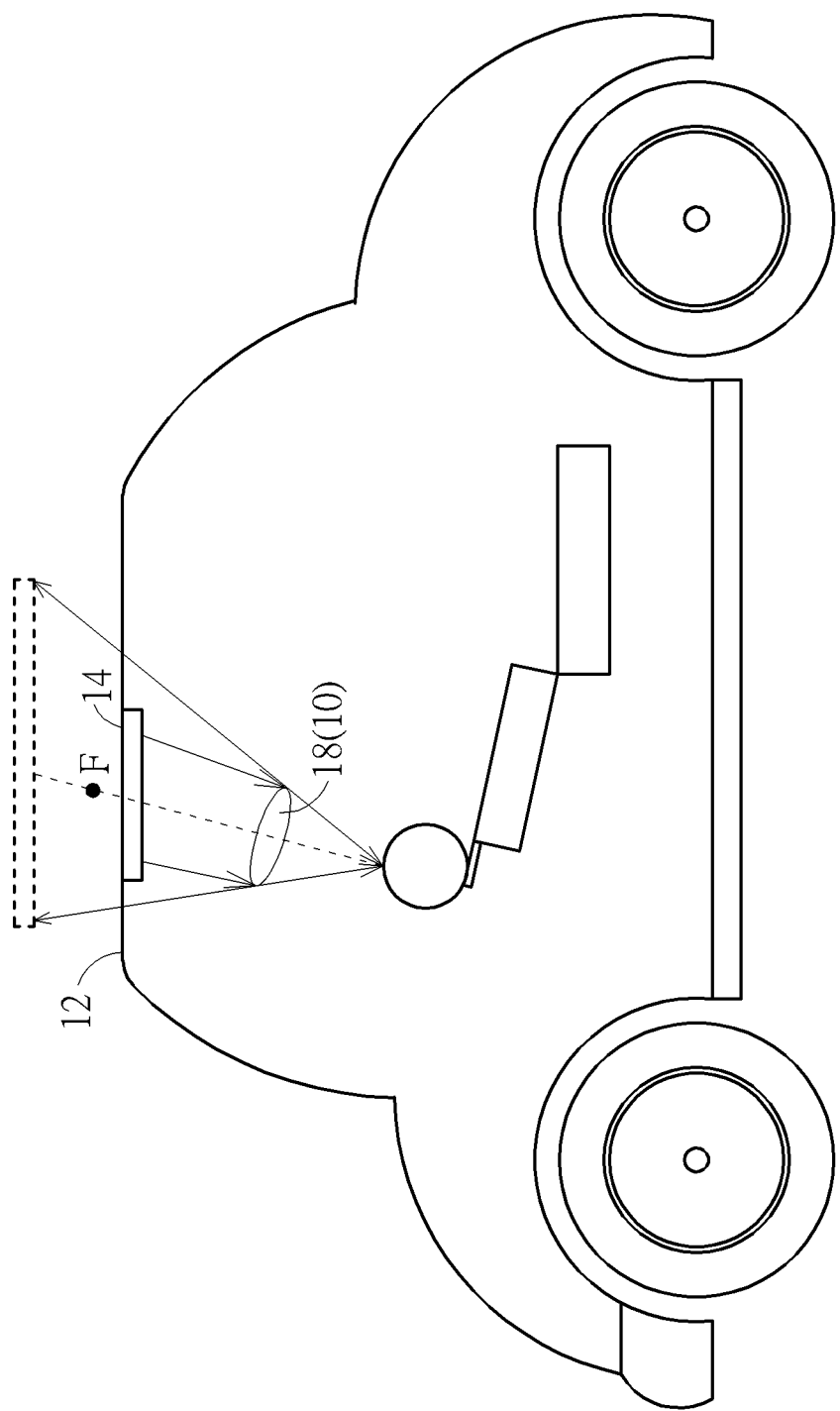
FIG. 4 is a lateral view of part of the automotive theater apparatus according to the embodiment of the present invention.

While the automotive theater apparatus 10 is in operation, the substantially transparent optical element 18 is configurable to be positioned in the line-of-sight of the user. The line-of-sight of the user will pass through the substantially transparent optical element 18 to view the image projected onto the surface structure 14. According to the embodiment of the present invention, the substantially transparent optical element 18 may be the Fresnel lens configured to create an enlarged virtual image at an imaging distance further away than the surface structure 14 for the user, and the virtual image is related to the projected image. Please refer to FIG. 4. FIG. 4 is a lateral view of part of the automotive theater apparatus according to the embodiment of the present invention. The substantially transparent optical element 18 is positioned in the line-of-sight of the user, and the automotive theater apparatus 10 may modulate the positions and sizes of the virtual image (which is a dotted line shown in FIG. 4) by varying the position of the substantially transparent optical element 18 relative to the surface structure 14. The position of the substantially transparent optical element 18 relative to the surface structure 14 is preferably close to and smaller than a focal length of the substantially transparent optical element 18; that is, the surface structure 14 and the image displayed on the surface structure 14 are located within a focus F of the substantially transparent optical element 18, so that the enlarged virtual image is formed behind the surface structure 14, i.e. on a side of the surface structure 14 opposite to the user. The relation between the substantially transparent optical element 18, the focus F, and the surface structure 14 is not limited to the above-mentioned embodiment, and depends on design demand.

The substantially transparent optical element 18 is positioned in the line-of-sight of the user, and if the user sees through the substantially transparent optical element 18, the generated image is fully covered by the substantially transparent optical element 18. The user will see the entirety of the image through the substantially transparent optical element 18, but not see the image on the surface structure 14 directly. Arrangement of the substantially transparent optical element 18 may be set according to information about the user, such as a height and a posture of the user. The automotive theater apparatus 10 may set several sensors to sense the information about the user for feedback, and the substantially transparent optical element 18 may be positioned at preferred position accordingly. Further, the vehicle 12 may preset and store a plurality of seat parameters according to user's demand; while the user chooses a predetermined mode to automatically adjust the seat parameters (such as shifting, lowering and inclining the seat), the automotive theater apparatus 10 may receive the foresaid seat parameters and adjust the arrangement of the substantially transparent optical element 18 accordingly.

For adjusting the substantially transparent optical element 18, the automotive theater apparatus 10 may optionally include a supporting device 20 and a driving device 22. The supporting device 20 may be a suspension arm or any structural component with similar functions. As shown in FIG. 1 to FIG. 4, the supporting device 20 is configured to position the substantially transparent optical element 18 in the line-of-sight of the user. The driving device 22 may be an electric motor connected to the supporting device 20. The driving device 22 may be configured to move the substantially transparent optical element 18 to an operating position (which may be shown in FIG. 1 to FIG. 4) when the automotive theater apparatus 10 is activated and to an accommodating position (which is not shown in the figures) when the automotive theater apparatus 10 is deactivated.

In addition, the automotive theater apparatus 10 may further include an image capturing device 24 and a controller 26. The controller 26 is electrically connected to the image capturing device 24 and the image generating device 16. The image capturing device 24 is configured to acquire an environmental image outside the vehicle 12. The environmental image may be a scene the user will see when looking through the surface structure 14. The image capturing device 24 may be put inside or outside the vehicle 12. The controller 26 is configured to acquire the environmental image, and control the image generating device 16 to generate an image according to features of the acquired environmental image; for example, the environmental image may be a background of the image projected onto the surface structure 14. An embodiment of the present invention is configured to overlap the image generated by the image generating device 16 with the background scene outside the surface structure 14.

Figure 5:
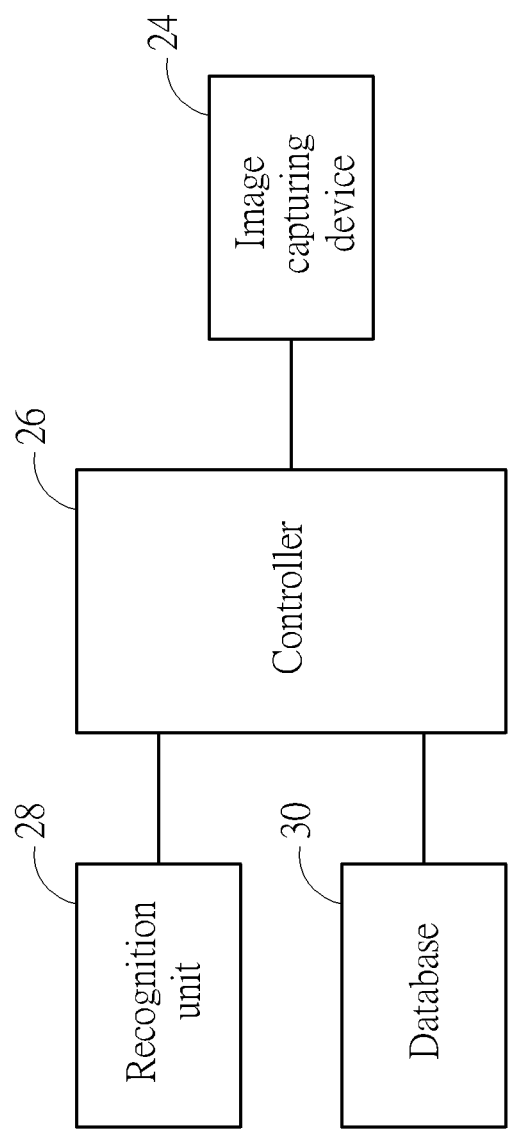
FIG. 5 is a functional block diagram of the controller according to the embodiment of the present invention.
Figure 6:
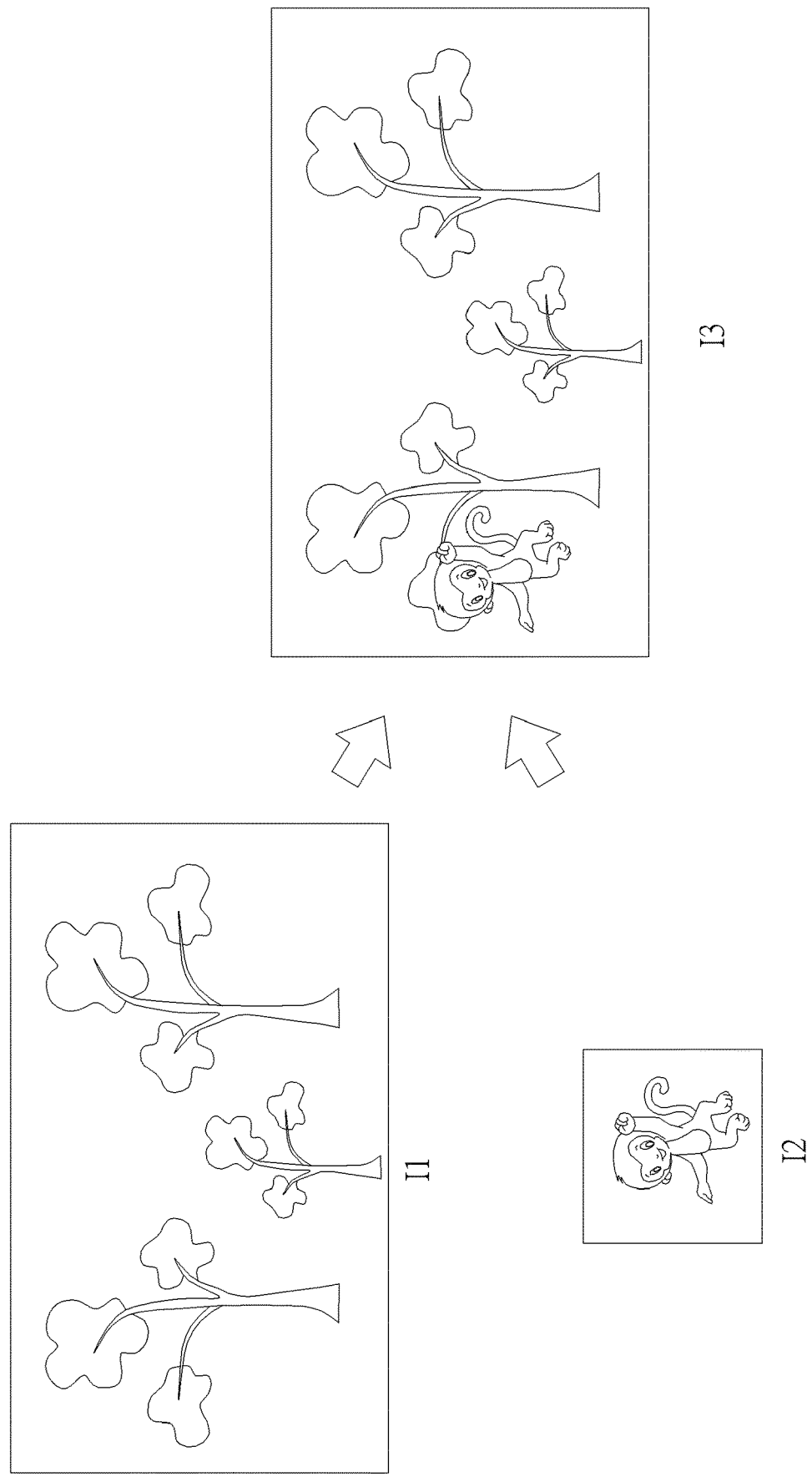
FIG. 6 is a diagram of the environmental image overlapped with the generated image according to the embodiment of the present invention.

Please refer to FIG. 5 and FIG. 6. FIG. 5 is a functional block diagram of the controller 26 according to the embodiment of the present invention. FIG. 6 is a diagram of the environmental image I1 overlapped with the generated image I2 according to the embodiment of the present invention. The controller 26 may be connected to a recognition unit 28 and a database 30. The controller 26 can control the generated image I2 to be generated correlating to the environmental image I1. The recognition unit 28 may analyze the features of the environmental image I1 and correlate the features to the database 30, and the generated image I2 may be generated correlating to the environmental image I1, so that a final image I3 can be generated based on an analysis result of the recognition unit 28 by the image generating device 16 accordingly. For example, the environmental image I1 may contain a pattern about trees and the generated image I2 may contain a pattern about monkeys, so that the recognition unit 28 may adjust a position of the generated image I2 relative to the environmental image I1 to overlap the monkeys and the trees. Besides, after recognition of the features of the environmental image I1, the controller 26 may pick some parameters from the database 30 of the automotive theater apparatus 10 and compare the parameters with the features of the environmental image I1 for deciding the position of the generated image I2 relative to the environmental image I1.

Figure 7:
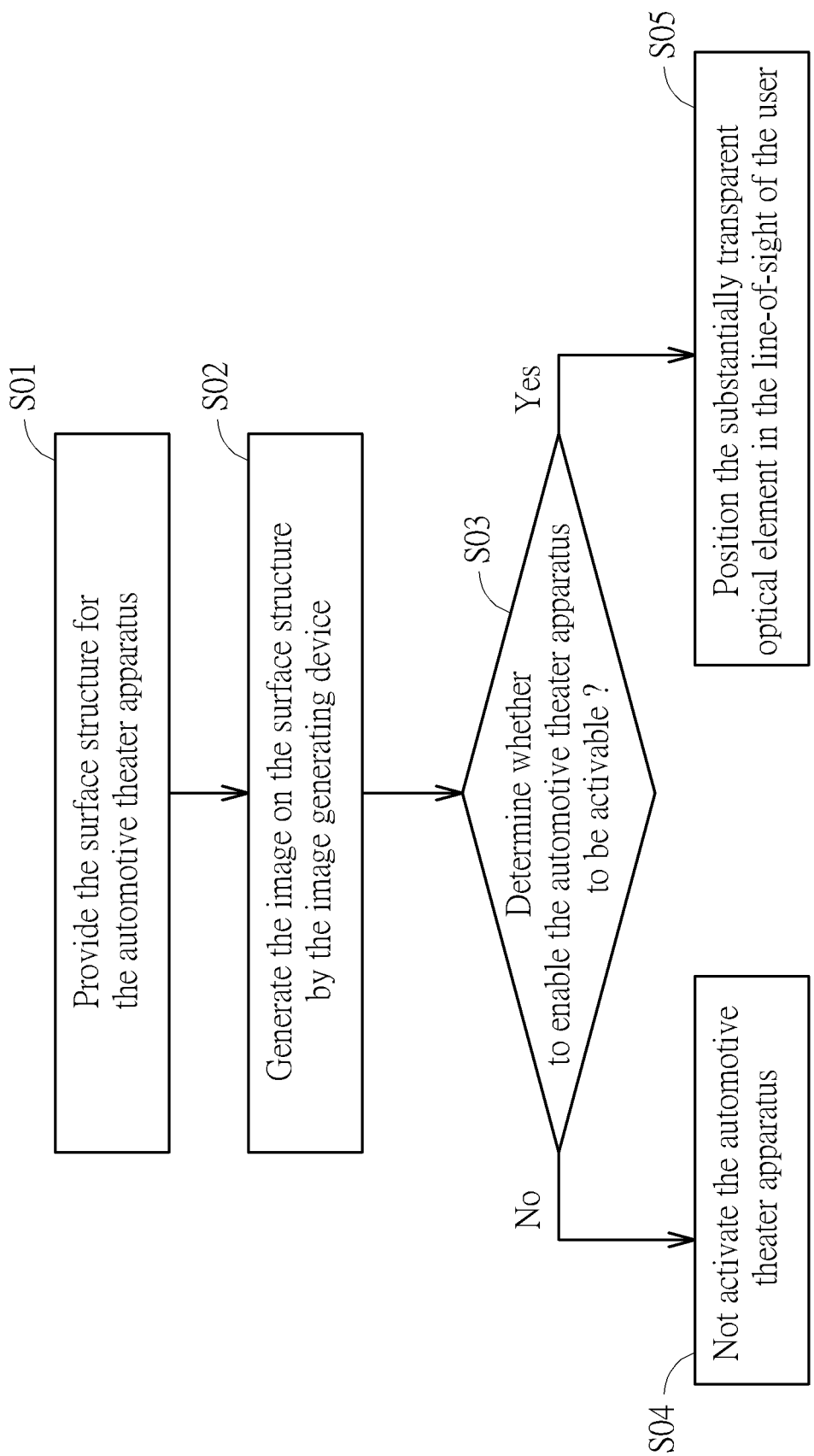
FIG. 7 is a diagram of an operating method according to the embodiment of the present invention.

Please refer to FIG. 7. FIG. 7 is a diagram of an operating method according to the embodiment of the present invention. The operating method may be applied to the automotive theater apparatus 10. The operating method may provide the surface structure 14 for the automotive theater apparatus 10 (step S01), and generate the image on the surface structure 14 by the image generating device 16 (step S02). The operating method may determine whether to enable the automotive theater apparatus 10 to be activable only when the vehicle 12 is parked or in an autonomous driving mode (step S03). If no, the automotive theater apparatus 10 is deactivated (step S04). If yes, the operating method may position the substantially transparent optical element 18 in the line-of-sight of the user (step S05), and the substantially transparent optical element 18 is used to enable the user to view the virtual image of the generated image. In addition, the operating method further may utilize the supporting device 20 and the driving device 22 to adjust the position of the substantially transparent optical element 18 in accordance with the user's demand and the predefined mode of the seat. Setting of the position of the generated image relative to the environmental image is illustrated as mentioned above, and a detailed description is omitted herein for simplicity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An automotive theater apparatus applied to a vehicle, the automotive theater apparatus comprising:
   an image generating device configured to generate an image;
   a surface structure whereon the image is formed;
   a substantially transparent optical element configurable to be positioned in a line-of-sight of a user, wherein the substantially transparent optical element is configured to enable the user to view a virtual image of the generated image; and
   a supporting device configured to position the substantially transparent optical element in the line-of-sight of the user.

2. The automotive theater apparatus of claim 1, further comprising:
   a driving device connected to the supporting device, the driving device being configured to move the substantially transparent optical element to an operating position when the automotive theater apparatus is activated and to an accommodating position when the automotive theater apparatus is deactivated.

3. The automotive theater apparatus of claim 1, wherein the surface structure is a window of the vehicle, the image generating device generates the image and projects the image onto the window, and the substantially transparent optical element is positioned between the user and the window.

4. The automotive theater apparatus of claim 3, wherein the substantially transparent optical element is further configured to form the enlarged virtual image on a side of the window opposite to the user.

5. The automotive theater apparatus of claim 3, wherein if the user sees through the substantially transparent optical element, the generated image is fully covered by the substantially transparent optical element.

6. The automotive theater apparatus of claim 3, wherein the image generating device is a projector configured to project an image onto the window.

7. The automotive theater apparatus of claim 3, wherein the image generating device is a translucent display panel assembled with the window.

8. The automotive theater apparatus of claim 3, wherein the window is processed by surface treatment, pasted by a scattering film or coated by scattering material to provide light scattering function.

9. The automotive theater apparatus of claim 3, wherein the window is a sunroof disposed on a roof rack of the vehicle.

10. The automotive theater apparatus of claim 1, wherein the substantially transparent optical element is a Fresnel lens, and distortion of the generated image is calibrated by the substantially transparent optical element.

11. The automotive theater apparatus of claim 1, wherein the automotive theater apparatus may only be activated while the vehicle is parked or in autonomous driving mode.

12. The automotive theater apparatus of claim 1, further comprising:
    an image capturing device configured to capture an environmental image outside the vehicle; and
    a controller electrically connected to the image capturing device and the image generating device, and configured to control the image generating device to generate the image according to features of the environmental image.

13. The automotive theater apparatus of claim 12, wherein the controller analyzes the features of the environmental image and correlates the features to a features database.

14. The automotive theater apparatus of claim 12, wherein the controller is electrically connected to a database, and compares a datum from the database with the features of the environmental image for deciding position of the generated image.

15. An operating method applied to an automotive theater apparatus, the operating method comprising:
    providing a surface structure of a vehicle with the automotive theater apparatus;
    generating, by an image generation device, an image on the surface structure;
    positioning a substantially transparent optical element in a line-of-sight of a user, wherein the substantially transparent optical element is configured to enable the user to view a virtual image of the generated image; and
    moving, by a driving device, the substantially transparent optical element to an operating position when the automotive theater apparatus is activated and to an accommodating position when the automotive theater apparatus is deactivated.

16. The operating method of claim 15, further comprising:
    enabling the automotive theater apparatus to be activated only when the vehicle is parked or in an autonomous driving mode.

17. The operating method of claim 15, further comprising:
    acquiring, by an image capturing device, an environmental image outside the vehicle; and
    controlling, by a computer system, the generated image to be generated correlating to the environmental image.

18. The operating method of claim 17, further comprising:
    analyzing, by a computer system, features in the environmental image and correlating the features to a predetermined features database;
    generating, by the image generating device, an image based on the analyzed image.

* * * * *